April 6, 1965 A. J. WOLTERMAN 3,177,376

SEMICONDUCTOR LOGIC CIRCUIT COMPRISING TUNNEL DIODES AND BACKWARD DIODES

Filed July 17, 1961

INVENTOR
ARDEN J. WOLTERMAN

BY Bernard N. Wiener
ATTORNEY

United States Patent Office 3,177,376
Patented Apr. 6, 1965

3,177,376

SEMICONDUCTOR LOGIC CIRCUIT COMPRISING TUNNEL DIODES AND BACKWARD DIODES

Arden J. Wolterman, Apalachin, N.Y., assignor to International Business Machines Corporation, New York, N.Y., a corporation of New York Filed July 17, 1961, Ser. No. 124,525
4 Claims. (Cl. 307—88.5)

This invention relates generally to logic circuits for use in binary digital computers and more particularly to a logic circuit therefor utilizing tunnel diodes as switching elements.

A logic circuit for use in a binary digital computer has a plurality of pairs of input terminals and a plurality of pairs of output terminals. Input information signals applied to the pairs of input terminals are processed by the logic circuit in such a manner that the output information signals presented to the pairs of output terminals are logically related thereto. Output information signals are logically related to input information signals if they are derivable therefrom by Boolean algebra. Boolean algebra is a branch of mathematics commonly employed to express mathematical relationships in a binary number system. The input and output information when expressed in Boolean algebra are termed Boolean functions.

A logic circuit capable of providing both the Boolean SUM function of a plurality of binary inputs and the Boolean NOT-SUM function thereof has utility in digital computers. The terms SUM and NOT-SUM are used herein synonymously with the terms AND and NOT-AND, respectively.

It is a first object of this invention to provide a logic circuit which provides Boolean functions of a plurality of binary inputs.

It is a second object of this invention to provide a logic circuit for providing both the Boolean SUM function of a plurality of binary inputs and the Boolean NOT-SUM function thereof.

It is a third object of this invention to provide a logic circuit for providing both the Boolean SUM function of a plurality of binary inputs and the Boolean NOT-SUM function thereof which utilizes tunnel diodes as the two-state switching elements thereof.

It is a fourth object of this invention to provide a HALF-ADDER for providing both the sum of two binary inputs and the associated carry which utilizes tunnel diodes as the two-state switching elements thereof.

It is a fifth object of this invention to provide an AND logic circuit which includes a plurality of tunnel diodes as the two-state switching elements thereof.

It is a sixth object of this invention to provide an OR logic circuit which includes a plurality of backward diodes and a tunnel diode as the two-state switching element thereof.

The foregoing and other objects, features and advantages of the invention will be apparent from the following more particular description of preferred embodiments of the invention as illustrated in the accompanying drawings.

Figures 1, 2, 3, 4, 5, 6:
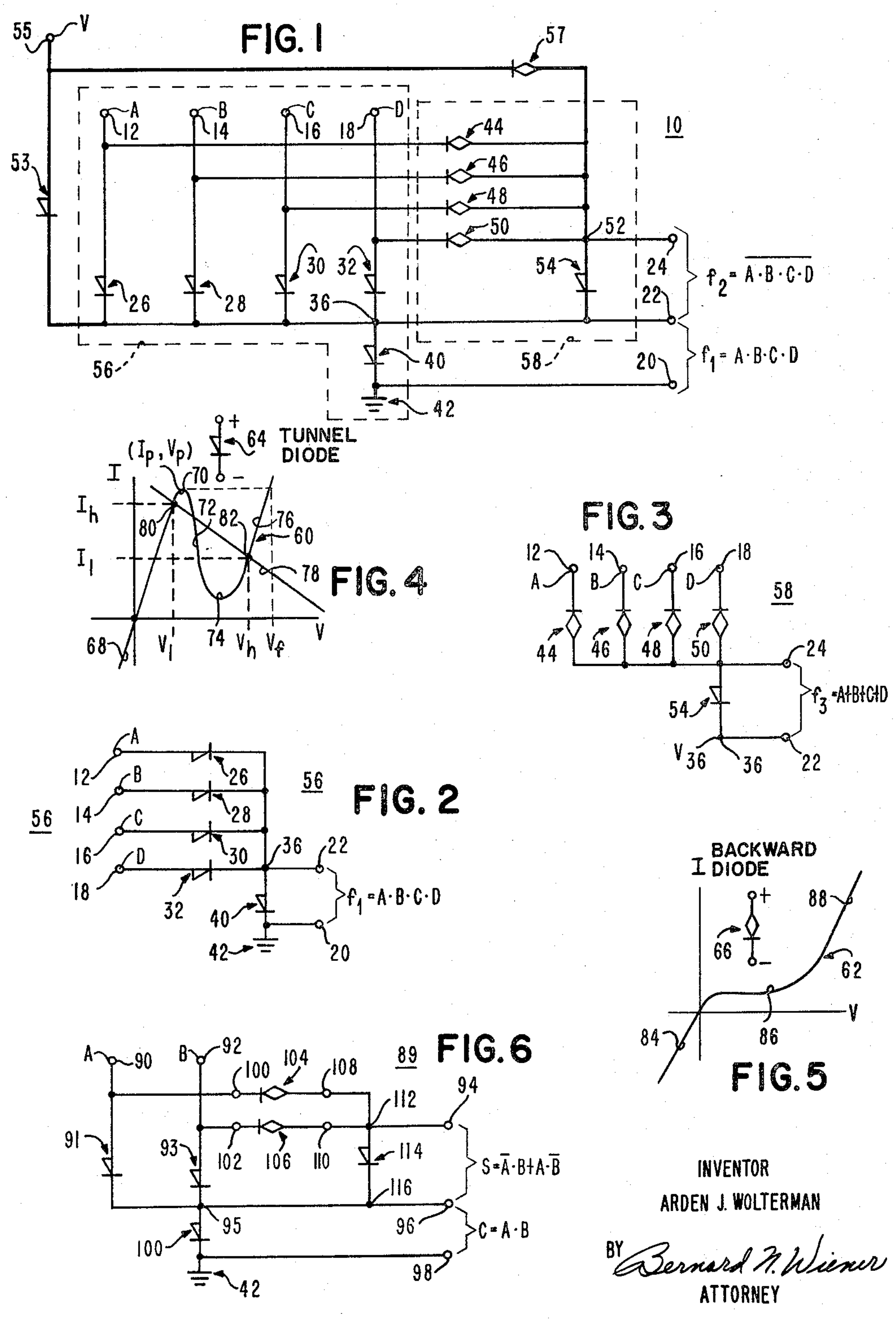
FIGURE 1 illustrates a logic circuit in accordance with this invention for providing both the Boolean SUM function and the Boolean NOT-SUM function of a plurality of binary inputs.
FIGURE 2 illustrates an AND logic circuit in accordance with this invention utilizing tunnel diodes as the two-state switching elements thereof.
FIGURE 3 illustrates an OR logic circuit in accordance with this invention utilizing backward diodes and a tunnel diode as the two-state switching element thereof.
FIGURE 4 is an illustrative current-voltage curve for a typical tunnel diode suitable for the practice of this invention.
FIGURE 5 is an illustrative current-voltage curve for a typical backward diode suitable for the practice of this invention.
FIGURE 6 illustrates a HALF-ADDER logic circuit in accordance with this invention.

A logic circuit in accordance with this invention accepts binary signal information and provides related Boolean functions thereof. Generally, the logic circuit has a plurality of pairs of input terminals and a plurality of pairs of output terminals. The binary signal information is applied to the pairs of input terminals. A respective input threshold two-state switching element is connected to each input terminal. The threshold operating parameter of each two-state element is essentially the same. The input threshold elements are commonly connected at a junction. A second threshold two-state element is connected between the junction and ground potential. The second two-state device has a threshold operating parameter such that the sum of $n-1$ threshold element operating parameters is insufficient to cause the second two-state device to change states while the sum of the $n$ input threshold element operating parameters is adequate to cause the transition between the stable states thereof. To each of the input terminals there is connected a respective unilateral impedance. The unilateral impedances are commonly connected to another junction. A third threshold two-state device is connected between the second junction and the first noted junction. The output terminals of the logic circuit are established by the ground connection, the first common junction and the second common junction. The signal obtained from the first noted pair of terminals is the Boolean SUM function of the binary signal information and the signal obtained from the second noted pair of output terminals is the Boolean NOT-SUM function thereof.

In certain uses of the invention where binary signal information voltage is not always available at the pairs of input terminals, an additional threshold switching circuit is connected to the first noted common junction. A constant binary signal information voltage is applied to the latter circuit to assure that the Boolean NOT-SUM function is provided by the logic circuit.

A feature of this invention is a logic circuit as above in which the threshold two-state elements are tunnel diodes and the unilateral impedances are backward diodes.

Another feature of this invention is an AND logic circuit having a plurality of input tunnel diodes and an output tunnel diode commonly connected thereto.

Still another feature of this invention is an OR logic circuit having a plurality of input backward diodes and an output tunnel diode.

One other feature of this invention is a HALF-ADDER logic circuit which is a special case of the general logic circuit described above. It has two input tunnel diodes and an output tunnel diode in an AND logic circuit portion and two backward diodes and a second output tunnel diode in an OR logic circuit portion. The output signal across one pair of output terminals is the Boolean sum of the binary information signals applied to the pairs of input terminals and the output signal across the second pair of output terminals is the Boolean carry. The Boolean sum and Boolean carry of two binary information signals are defined by a Truth Table in which all possible binary number combinations thereof are presented.

The tunnel diode is a two-state element which changes stable states as a result of a quantum-mechanical tunneling phenomenon. It is widely described in the technical literature, illustrative of which is the article at page 1202 of the Proceedings of the IRE, July 1959. The backward diode is a unilateral impedance related in structure to the tunnel diode but which does not have two states. The backward diode is widely described in the literature, illustrative of which is the article at page 50 of the Electrical Design News, May 1960.

FIGURE 1 presents a logic circuit in accordance with this invention for providing the Boolean SUM function of a plurality of binary inputs and the Boolean NOT-SUM function thereof. Logic circuit 10 includes input terminals 12, 14, 16 and 18 to which are applied binary inputs A, B, C and D, respectively. The Boolean functions $f_1=A\cdot B\cdot C\cdot D$ and $f_2=\overline{A\cdot B\cdot C\cdot D}$ are obtained from output terminal pairs 20 and 22 and 22 and 24, respectively. Tunnel diodes 26, 28, 30 and 32 are connected to input terminals 12, 14, 16 and 18, respectively, and to tunnel diode common junction 36 and are poled in the forward directions therebetween. Output tunnel diode 40 is connected in the forward direction between tunnel diode common junction 36 and ground 42. Backward diodes 44, 46, 48 and 50 are connected to input terminals 12, 14, 16 and 18, respectively, and backward diode common junction 52. They are poled in the forward direction between common junction 52 and the input terminals. Output tunnel diode 54 is connected in the forward direction between backward diode common junction 52 and tunnel diode common junction 36. Output terminals 20, 22 and 24 are connected to ground 42, junction 36 and junction 52, respectively.

In certain uses of the logic circuit 10, binary signal information voltage is not always available on one of the input terminals 12, 14, 16, and 18. In order that the logic circuit 10 perform its intended purpose in these circumstances, additional circuitry is added thereto. The additional circuitry includes simulation tunnel diode 53 connected in the forward direction between voltage terminal 55 and common junction 36; and simulation backward diode 57 connected in the forward direction between common junction 52 and voltage terminal 55. A constant binary voltage V is applied to voltage terminal 55 to simulate a binary "1" input to logic circuit 10.

The logic circuit 10 includes an AND logic circuit 56 and an OR logic circuit 58 which are presented in FIGURES 2 and 3, respectively. FIGURES 4 and 5 illustrate the current-voltage curves 60 and 62 for a typical tunnel diode 64 and a typical backward diode 66, respectively, suitable for the practice of this invention.

Current-voltage curve 60 of FIGURE 4 for typical tunnel diode 64 has first rising portion 68 which passes through the I-V origin, peak 70, negative resistance region 72, valley region 74 and second rising portion 76. Illustrative load line 78 intersects curve 60 at stable operating points 80 and 82. Operating point 80 is established at high current $I_h$ and low voltage $V_1$. Operating point 82 is established at low current $I_1$ and high voltage $V_h$.

Current-voltage curve 62 of FIGURE 5 for typical backward diode 66 has first rising portion 84 which passes through the I-V origin, substantially flat portion 86 and second rising portion 88.

The operation of logic circuit 10 of FIGURE 1 will be described by considering the operation of AND logic circuit 56 (FIGURE 2) and OR logic circuit 58 (FIGURE 3) in conjunction with the I-V curves of FIGURES 4 and 5.

With reference to FIGURES 2 and 4, tunnel diodes 26, 28, 30 and 32 have substantially identical current-voltage curves with illustrative peak current $I_p$, i.e., $$I_p^{26}=I_p^{28}=I_p^{30}=I_p^{32}$$

The relationship of the peak current of output tunnel diode 40 thereto is such that:

$$I_p^{26}+I_p^{28}+I_p^{30}<I_p^{40}$$

and $$I_p^{26}+I_p^{28}+I_p^{30}+I_p^{32}>I_p^{40}$$

In general, if there are input tunnel diodes of number $n$: ($a$) the sum of the peak currents of $n-1$ input tunnel diodes must not exceed the peak current of the output tunnel diode, and ($b$) the sum of the $n$ input tunnel diode peak currents must exceed the peak current of the output tunnel diode.

The relationship of the input voltages applied to input terminals 12, 14, 16 and 18 for logic circuit operation is as follows: A binary "1" is represented by an put voltage approximately equal to $V_f$ for input tunnel diodes 26, 28, 30 and 32, respectively; and a binary "0" is represented by zero applied voltage. Where A, B, C and D are the Boolean equivalents for the binary inputs, the SUM thereof $f_1=A.B.C.D.$ is obtained as the voltage across terminals 20 and 22. Voltage $V_f$ (FIGURE 4) is the voltage on the second rising portion 82 of curve 60 at approximately the current $I_p$.

The operation of AND logic circuit 56 for an illustrative initial condition when binary information signals A, B and C are present on input terminal 12, 14 and 16, respectively, is as follows: The tunnel diodes 26, 28 and 30 are in the high voltage state $V_h$ to the right of peak 70 on curve 60. Tunnel diodes 32 and 40 are in the low voltage state $V_1$ to the left of peak 70. It should be noted that each diode will be in a state defined by some load line 78. When binary signal information signal D is applied to input terminal 18, the current rises in tunnel diode 32 until the current in tunnel diode 40 exceeds its peak current $I_p$. Then tunnel diode 40 switches to its high voltage state $V_h$ and tunnel diodes 26, 28 and 30 are switched to their low voltage state $V_1$.

The OR logic circuit 58 has tunnel diode 54 with $I_p^{54}$ such that an input voltage representative of a binary "1" on a terminal 12, 14, 16 or 18 causes it to switch from $I_h$ to $I_1$. In terms of Boolean algebra, if the binary inputs are A, B, C and D, the voltage across terminals 22 and 24 represents the Boolean function $$f_3=A+B+C+D$$

The plus sign "+" indicates "or."

With reference to logic circuit 10 of FIGURE 1, when at least one input is present on a terminal A, B, C or D and the simulation circuitry operated by voltage $V_{"1"}$ is not used, $$f_1=A\cdot B\cdot C\cdot D$$

and $$f_2=\overline{A\cdot B\cdot C\cdot D}$$

However, when there is no input $$f_1=0$$

and $$f_2=0$$

When the noted simulation circuitry operated by voltage $V_{"1"}$ is used, the Boolean functions $f_1=A\cdot B\cdot C\cdot D$ and $f_2=\overline{A\cdot B\cdot C\cdot D}$ are always provided by logic circuit 10.

It will be readily apparent to one skilled in the art that the logic circuit 10 can be generalized to handle any finite number of binary inputs. The only limitation in the possible number of inputs will be the accuracy with which the I-V characteristics of the input tunnel diodes and the input voltages can be controlled. For the general case, the Boolean SUM function is $$f_1=\sum_1^n A_n$$

and the Boolean NOT-SUM function is $$f_2=\sum_1^n \bar{A}_n$$

A HALF-ADDER voltage operated logic circuit has two input terminals and a pair of output terminals. When a binary input voltage is applied to each pair of input terminals, the Boolean sum thereof appears at one pair of output terminals and the Boolean carry at the other pair of output terminals. The output Boolean carry sum and carry functions resulting from the binary addition process are related to the input binary numbers according to the Truth Table:

| Addend A | Augend B | Sum S | Carry C |
|---|---|---|---|
| 0 | 0 | 0 | 0 |
| 0 | 1 | 1 | 0 |
| 1 | 0 | 1 | 0 |
| 1 | 1 | 0 | 1 |

where:

$$S=\bar{A}\cdot B+A\cdot\bar{B}$$

and $$C=A.B$$

S represents the sum term, and C represents the carry term resulting from the addition of the two binary numbers A and B. The above equations state that the information signal representing the sum S output of a HALF-ADDER circuit is a "1" if the binary number A is not a "1" and the binary number B is a "1," number A is a "1" and the binary number B is not a "1." The carry C is a "1" only if the binary numbers A and B are both "1's."

FIGURE 6 presents a HALF-ADDER 89 in accordance with this invention. Binary inputs A and B are presented to terminals 90 and 92 and the outputs $S=\bar{A}\cdot B+A\cdot\bar{B}$ and $C=A.B$ are obtained from pairs of output terminals 94 and 96 and 96 and 98, respectively. Tunnel diodes 91 and 93 on their input voltage sides are connected to input terminals 90 and 92, respectively, and to input tunnel diode common junction 95 on their output terminal sides. Common junction 95 is connected to the input terminal of tunnel diode 100 whose output terminal 98 is connected to ground. Input terminals 90 and 92 of HALF-ADDER logic circuit 89 are connected to the input terminals 100 and 102 of backward diodes 104 and 106, respectively. The output terminals 108 and 110 of backward diodes 104 and 106, respectively, are connected to the input terminal 112 of tunnel diode 114. The output terminal 116 of tunnel diode 114 is connected to HALF-ADDER output terminal 96.

While the invention has been particularly shown and described with reference to preferred embodiments thereof, it will be understood by those skilled in the art that various changes in form and details may be made therein without departing from the spirit and scope of the invention.

What is claimed is:

1. A logic circuit comprising a plurality of binary information signal input terminals, a respective plurality of input tunnel diodes connected to said input terminals, said input tunnel diodes being commonly connected at a first junction to one terminal of a first output tunnel diode, said first output tunnel diode being connected to ground at its other terminal, a plurality of backward diodes, said backward diodes having one terminal thereof respectively connected to corresponding input terminals, said backward diodes being commonly connected to one terminal of a second output tunnel diode at their other terminals, said second output tunnel diode being connected at its other terminal to said first common junction, said first common junction defining a first output terminal, the common junction of the backward diodes to the second output tunnel diode defining a second output terminal and said ground junction of said first output tunnel diode defining a third output terminal, whereby a plurality of binary information signals applied to said respective input terminals are translated by said logic circuit so that first and second Boolean functions related thereto are obtained from said first and second output terminals and said second and third output terminals, respectively.

2. A HALF-ADDER logic circuit comprising first and second input terminals, first and second input tunnel diodes connected to said input terminals, a first output tunnel diode commonly connected to said input tunnel diodes and to ground, first and second backward diodes connected respectively to said input terminals, a second output tunnel diode commonly connected to said backward diodes and to the common junction of the input tunnel diodes and the first output tunnel diode, said ground defining a first output terminal, the junction of the input tunnel diodes and the first output tunnel diode defining a second output terminal and the common junction of the backward diodes and the second output tunnel diode defining a third output terminal whereby an Addend binary information signal applied to said first input terminal is added to an Augend binary information signal applied to said second input terminal by said HALF-ADDER logic circuit to provide the Boolean sum thereof across said third and second output terminals and the Boolean carry thereof across said second and first output terminals.

3. A logic circuit having a plurality of tunnel diodes each connected to a binary information signal input, the output terminals thereof being connected to the input of a first output tunnel diode, the peak current of said output tunnel diode being approximately equal to the algebraic sum of the peak currents of said input tunnel diodes, said binary inputs being connected respectively to a plurality of backward diodes, the outputs of said backward diodes being connected to the input of a second output tunnel diode, whereby the output of said first tunnel diode provides the Boolean SUM function of said plurality of binary inputs and the output of said second tunnel diode provides the Boolean NOT-SUM function thereof.

4. A logic circuit comprising a plurality of binary information signal input terminals, a respective plurality of input threshold two-state negative-resistance switching elements connected to said input terminals, said input switching elements being commonly connected at a first junction to one terminal of a first output two-terminal threshold two-state switching element, said first output switching element being connected to ground at its other terminal, a plurality of two-terminal unilateral impedances, said unilateral impedances being respectively connected at one terminal thereof to corresponding input terminals, said unilateral impedances at their other terminals being commonly connected at a second common junction to a second threshold two-state switching element, said second threshold two-state switching element being connected to said first common junction, said first common junction defining a first output terminal, said second common junction defining a second output terminal and said ground connection of said first output switching element defining a third output terminal, whereby a plurality of binary information signals applied to said respective input terminals are translated by said logic circuit so that first and second Boolean functions related thereto are obtained from said first and second output terminals and said second and third output terminals, respectively.

(References on following page)

References Cited by the Examiner

UNITED STATES PATENTS

| | | | |
|---|---|---|---|
| 2,892,099 | 6/59 | Gray | 307—88.5 |
| 3,019,981 | 2/62 | Lewin | 307—88.5 |
| 3,023,965 | 3/62 | Campbell | 307—88.5 |

OTHER REFERENCES

"Tunnel Diode Manual" published by General Electric, Mar. 20, 1961, pages 55–60 and FIGURE 6.2 relied on.

"Tunnel Diode Logic Circuits" (Chow) published in Electronics, June 24, 1960, pages 103–107 and FIGURE 2 relied on.

"Tunnel Diode Circuit Design Handbook," by Transistron Electronic Corporation, AN–1359A, dated March 1961. FIG. 16 relied on.

"Avalanche Region Diode Logic," by Logue et al. in IBM Tech. Disclosure Bulletin vol. 1, No. 6, April 1951, pages 23–24.

ARTHUR GAUSS, *Primary Examiner.*

JOHN W. HUCKERT, *Examiner.*